United States Patent [19]
Kobayashi et al.

[11] Patent Number: 5,422,639
[45] Date of Patent: Jun. 6, 1995

[54] NAVIGATION EQUIPMENT WHICH DETERMINES CURRENT POSITION DEPENDENT ON DIFFERENCE BETWEEN CALCULATED VALUE OF SELF-CONTAINED NAVIGATION AND MEASURED VALUE OF RADIO NAVIGATION

[75] Inventors: Yoshiyuki Kobayashi, Zama; Yoshikazu Hirayama, Sagamihara, both of Japan

[73] Assignee: Xanavi Informatics Corporation, Zama, Japan

[21] Appl. No.: 122,867

[22] Filed: Sep. 16, 1993

[30] Foreign Application Priority Data

Sep. 16, 1992 [JP] Japan ................. 4-246741

[51] Int. Cl.$^6$ ................................ G08G 1/123
[52] U.S. Cl. .......................... 340/988; 340/995; 364/443; 364/449
[58] Field of Search ............... 364/449, 443; 342/357, 342/457; 340/988, 990, 995

[56] References Cited

U.S. PATENT DOCUMENTS

| | | | |
|---|---|---|---|
| 4,713,767 | 12/1987 | Sato et al. | 340/988 |
| 4,774,672 | 9/1988 | Tsunoda et al. | 340/995 |
| 4,989,151 | 1/1991 | Nuimura | 340/995 |
| 5,179,519 | 1/1993 | Adachi et al. | 340/995 |
| 5,220,509 | 6/1993 | Takemura et al. | 340/988 |
| 5,283,575 | 2/1994 | Kao et al. | 340/995 |
| 5,293,318 | 3/1994 | Fukushima | 340/995 |

FOREIGN PATENT DOCUMENTS 1-316607A 12/1989 Japan .

*Primary Examiner*—Brent Swarthout
*Attorney, Agent, or Firm*—Pennie & Edmonds

[57] ABSTRACT

In a case where a flag delivered from a self-contained navigation processor indicates that a position measured by the self-contained navigation processor lies on or in the vicinity of a road contained in road map information, a position correction processor selects and delivers the measured position of the self-contained navigation processor as an output current position. In any other case, the position correction processor calculates the distance between a position measured by a radio navigation processor and the position measured by the self-contained navigation processor. On condition that the distance between the coordinates of the two positions has, at least, a predetermined value, the position correction processor decides the measured position of the radio navigation processor as a current position, and it corrects to the current position a drive starting coordinate point which is managed by the self-contained navigation processor.

10 Claims, 8 Drawing Sheets

○ : POSITION BASED ON SELF-CONTAINED NAVIGATION
× : POSITION BASED ON RADIO NAVIGATION
——— : ACTUAL DRIVE PATH
---- : DRIVE PATH BY NAVIGATION EQUIPMENT

NAVIGATION EQUIPMENT WHICH DETERMINES CURRENT POSITION DEPENDENT ON DIFFERENCE BETWEEN CALCULATED VALUE OF SELF-CONTAINED NAVIGATION AND MEASURED VALUE OF RADIO NAVIGATION

BACKGROUND OF THE INVENTION

The present invention relates to a technique for the measurement of a position in a navigation equipment which is applied to a mobile object such as an automobile.

A prior-art technique for measuring a position in a navigation equipment for an automobile is known from the official gazette of Japanese Patent Application Laid-open No. 316607/1989.

This navigation equipment includes a radio navigation device which measures the position of the automobile by utilizing electric waves transmitted from artificial satellites, and a self-contained navigation device which measures the position of the automobile by using various sensors, road map information, etc. In operation, in a case where the difference between a position measured by the radio navigation device and a position measured by the self-contained navigation device exceeds a preset value, the measured result of the self-contained navigation device or a result obtained by processing this measured result with a predetermined filter is taken as an estimated positional value, which is used for correcting the offset of the measured value of the radio navigation device. To the contrary, in a case where the above difference does not exceed the preset value, the measured result of the radio navigation device or a result obtained by processing this measured result with a predetermined filter is taken as an estimated positional value, which is used for correcting the drift of the measured value of the self-contained navigation device.

SUMMARY OF THE INVENTION

According to the navigation equipment disclosed in the official gazette of Japanese Patent Application Laid-open No. 316607/1989, more importance is attached to the measured result based on the self-contained navigation device when the difference between the measured position of the radio navigation device and that of the self-contained navigation device exceeds a preset value, whereas more importance is attached to the measured result based on the radio navigation device when the difference in measured position does not exceeds the preset value.

In some circumstances, however, the position measurement of the radio navigation device cannot be utilized on account of, for example, a geographical factor, and the automobile is driven using only the self-contained navigation device. The measurement of the self-contained navigation device can err during such a period. In this case, a problem is incurred as stated below.

When the position measurement using the radio navigation device is thereafter restarted, the measured position thereof might differ from that of the self-contained navigation device in excess of the preset value. On this occasion, the equipment regards the measured result of the self-contained navigation device as more important and erroneously compensates for the offset of the measured value of the radio navigation device, leading to the problem that it cannot revert to the precise operation of measuring the position.

Therefore, the present invention has an object to provide a navigation equipment which can measure positions more precisely under various circumstances.

In order to accomplish the object, the present invention provides a navigation equipment which is installed on a mobile object in order to produce a current position of the mobile object as an output. The navigation equipment comprises radio navigation means for measuring the current position of the mobile object on the basis of electric waves received from artificial satellites, azimuth measurement means for measuring a traveling azimuth of the mobile object on the basis of at least one of an angular velocity and a geomagnetic angle, distance measurement means for measuring a driven distance of the mobile object, memory means for storing road map information therein, self-contained navigation means for obtaining one of a presumptive current position of the mobile object and a drive history thereof up to a current time by the use of the traveling azimuth measured by the azimuth measurement means and the driven distance measured by the distance measurement means up to the current time since a given drive starting position, and then collating one of the obtained presumptive current position and the obtained drive history with the road map information read out of the memory means, thereby determining a current position of the mobile object, and position correction means for delivering the determined current position of the self-contained navigation means as the final current position in the case where the determined current position of the self-contained navigation means and the measured current position of the radio navigation means do not differ in excess of a predetermined distance, and for delivering the measured current position of the radio navigation means as the final current position and also giving the self-contained navigation means the measured current position of the radio navigation means as a new drive starting point in the case where the determined and measured current positions differ in excess of the predetermined distance.

Desirably, the navigation equipment further comprises drive velocity measurement means for measuring a drive velocity of the mobile object; the radio navigation means also measuring a moving direction of the mobile object on the basis of the electric waves received from the artificial satellites; and azimuth correction means for deciding if the measured drive velocity of the drive velocity measurement means has, at least, a predetermined value, in the case where the position correction means delivers the measured final current position of the radio navigation means and also gives the self-contained navigation means the measured current position of the radio navigation means as the new drive starting point; and for correcting the azimuth measurement means by delivering the measured moving direction of the radio navigation means as a current traveling azimuth, on condition that the measured drive velocity has, at least, the predetermined value.

In operation, the position correction means in the present invention decides the difference between the position based on radio navigation and the position based on self-contained navigation and then corrects the position of the self-contained navigation, whereby the positional error of the navigation equipment is made less than the predetermined distance. Desirably, the position correction means decides that preciseness of the self-contained navigation which is judged from the difference between the position of the radio navigation and that of the self-contained navigation, the relationship between the self-contained navigation and the road map information, and the history of the positions determined by the self-contained navigation, and it corrects the position of the self-contained navigation in accordance with the decision, whereby the positional error of the navigation equipment is held within the error of the position relative to the driven distance while the mobile object is being driven on the road contained in the road map information, and it is held less than the predetermined distance while the mobile object is being driven on any other road. More desirably, the position correction means decides that preciseness of the self-contained navigation which is judged from the difference between the position of the radio navigation and that of the self-contained navigation, the relationship between the self-contained navigation and the road map information, and the history of the positions determined by the self-contained navigation, and it corrects the position of the self-contained navigation in accordance with the decision, whereby the positional error of the navigation equipment is made less than the predetermined distance when the indication of an erroneous position is highly possible in spite of being driven on the road contained in the road map information. Still more desirably, the position correction means decides also the preciseness of the radio navigation from the history of the positions measured by the radio navigation and then corrects the position of the self-contained navigation, whereby the error of the radio navigation can be prevented from correcting the position of the self-contained navigation to an erroneous position.

On the other hand, the azimuth correction means corrects the traveling azimuth of the mobile object simultaneously with the correction of the position of the self-contained navigation by the position correction means, thereby enhancing the preciseness of the self-contained navigation after the correction of the drive starting point thereof.

DETAILED DESCRIPTION OF THE PREFERRED EMBODIMENTS

The embodiments of navigation equipment according to the present invention will be described below using their installments in automobiles as examples.

Now, the first embodiment of the navigation equipment according to the present invention will be described.

Figure 1:
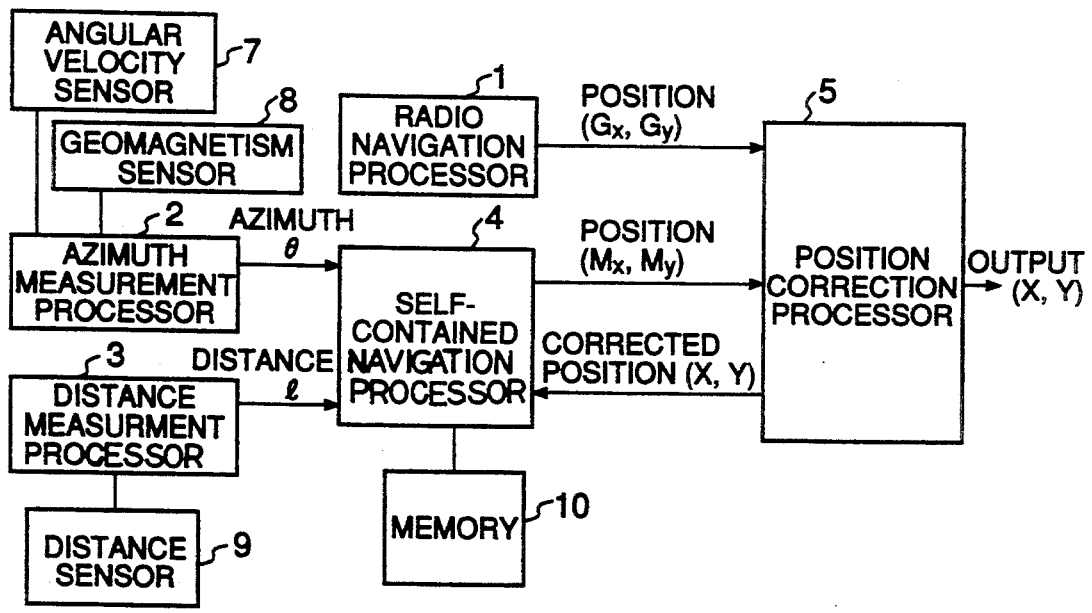
FIG. 1 is a block diagram showing the construction of a navigation equipment according to a first embodiment of the present invention.

FIG. 1 shows the construction of the navigation equipment in the first embodiment.

Referring to the figure, a radio navigation processor 1 determines a current position $(G_x, G_y)$ through the technique of triangular surveying based on the signals of a plurality of artificial satellites (not shown). An azimuth measurement processor 2 calculates and delivers the traveling azimuth $\theta$ of the vehicle by the use of angular velocity data detected by an angular velocity sensor 7 or/and geomagnetic data detected by a geomagnetism sensor 8. A distance measurement processor 3 measures and delivers the driven distance 1 of the vehicle on the basis of pulses received from a distance sensor 9.

Besides, a memory 10 stores road map information therein. A self-contained navigation processor 4 manages a certain drive starting point which is set manually or automatically. The self-contained navigation processor 4 determines a measured position $(M_x, M_y)$ in such a way that the distance data of the distance measurement processor 3 and the azimuth data of the azimuth measurement processor 2 with respect to the drive starting point are integrated to calculate a current estimated position, and that the estimated position, or the drive history of the vehicle up to a current time, the history having the estimated position as its end point, is collated with the road map information read out of the memory 10. In other words, the estimated position is compensated so that this estimated position or the drive history specified above may lie on a road, and the compensated position is determined as the measured position $(M_x, M_y)$.

A position correction processor 5 is supplied with the position $(G_x, G_y)$ produced by the radio navigation processor 1 and the position $(M_x, M_y)$ produced by the self-contained navigation processor 4, and it selects and delivers the position $(G_x, G_y)$ or the position $(M_x, M_y)$ as an output current position (X, Y) on the basis of a predetermined deciding method. In addition, when it has selected the position $(G_x, G_y)$ of the radio navigation processor 1 as the output current position (X, Y), it updates the drive starting point managed by the self-contained navigation processor 4, with the output current position (X, Y).

Next, the operation of the navigation equipment in the first embodiment will be explained.

Figure 2:
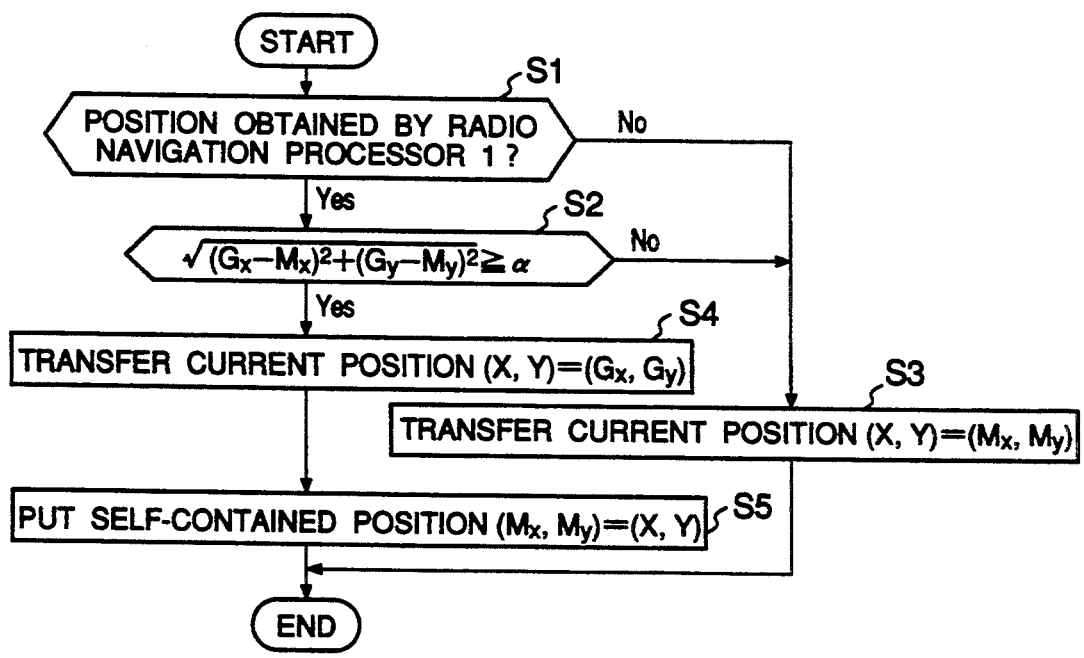
FIG. 2 is a flow chart showing the processing steps of the navigation equipment in the first embodiment.

FIG. 2 shows processing steps which are executed by the position correction processor 5 of the navigation equipment in the first embodiment.

As shown in the figure, the position correction processor 5 decides if the current position ($G_x$, $G_y$) has been obtained in the radio navigation processor 1, at a step S1. When the current position ($G_x$, $G_y$) has been obtained, the routine proceeds to a step S2, and when not, the routine proceeds to a step S3.

At the step S2, the position correction processor 5 computes the distance between the position ($G_x$, $G_y$) based on the radio navigation processor 1 and the position ($M_x$, $M_y$) based on the self-contained navigation processor 4, and it decides whether the distance between the coordinates of the two positions is, at least, a predetermined value $\alpha$ or is less than the predetermined value $\alpha$. When the distance has been decided as being the predetermined value $\alpha$ or greater, the routine proceeds to a step S4, and when not, the routine proceeds to the step S3.

At the step S3, the position correction processor 5 selects and delivers the position ($M_x$, $M_y$) of the self-contained navigation processor 4 as the output current position (X, Y). Then, it ends this series of processing steps.

At the step S4, the position correction processor 5 selects and delivers the position ($G_x$, $G_y$) of the radio navigation processor 1 as the output current position (X, Y). Subsequently, the routine proceeds to a step S5, at which the coordinate values of the drive starting point of the self-contained navigation as managed by the self-contained navigation processor 4 are corrected to a new drive starting point by the use of the position (X, Y) selected at the step S4. Then, the position correction processor 5 ends this series of processing steps.

Owing to such processing steps, the position measuring operation of the navigation equipment in the first embodiment is carried out as stated below.

Figure 3:
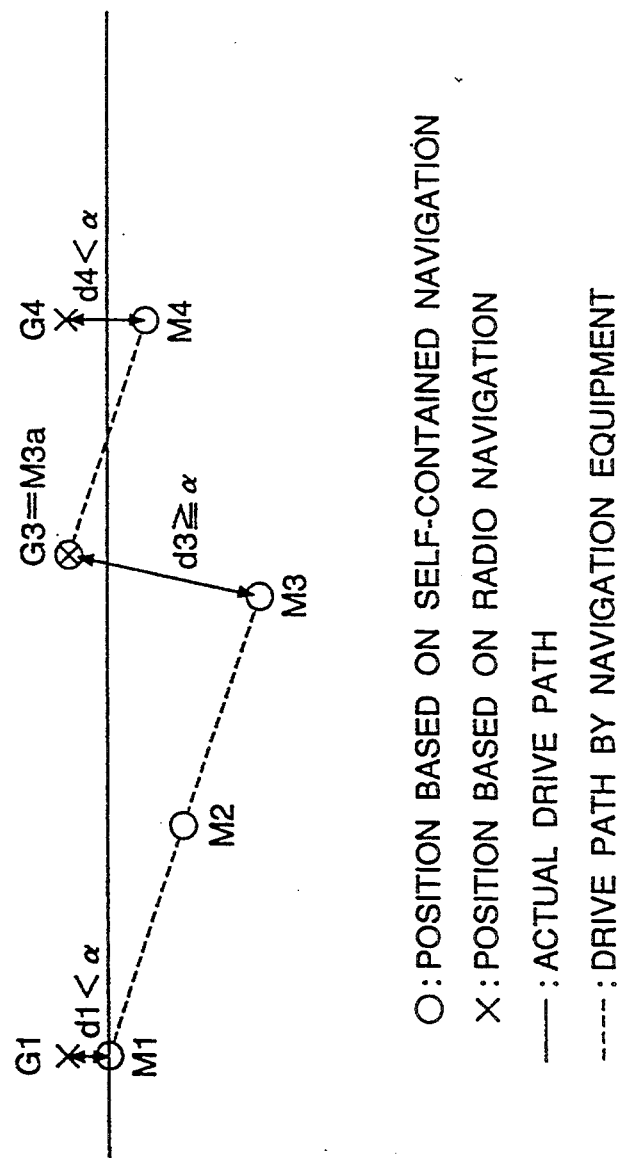
FIG. 3 is an explanatory diagram showing the operating example of the navigation equipment in the first embodiment.

FIG. 3 shows the operating example of the navigation equipment in the first embodiment.

Referring to the figure, symbol $G_i$ denotes the position ($G_x$, $G_y$) evaluated by the radio navigation processor 1, while symbol $M_i$ denotes the position ($M_x$, $M_y$) evaluated by the self-contained navigation processor 4. Besides, letter i (i=1, 2, ..., n) denotes the position corresponding to a time. A solid line indicates the actual drive path of the automobile, while a broken line indicates the automobile drive path measured and presented by the navigation equipment.

First, at the spot of i=1, the distance $d_1$ between the positions $G_1$ and $M_1$ is less than the predetermined value $\alpha$, so that the position ($M_{x1}$, $M_{y1}$) obtained with the self-contained navigation processor 4 is delivered as the output current position ($X_1$, $Y_1$).

Subsequently, at the spot of i=2, the position ($G_x$, $G_y$) is not evaluated by the radio navigation processor 1, so that the position ($M_{x2}$, $M_{y2}$) obtained with the self-contained navigation processor 4 is delivered as the output current position ($X_2$, $Y_2$).

Meanwhile, the distance $d_3$ between the positions $G_3$ and $M_3$ is the predetermined value $\alpha$ or greater at the spot of i=3. At this spot, therefore, the input position ($G_{x3}$, $G_{y3}$) obtained with the radio navigation processor 1 is delivered as the output current position ($X_3$, $Y_3$). Simultaneously, the drive starting position ($M_{x3}$, $M_{y3}$) managed by the self-contained navigation processor 4 is corrected to the new drive starting point by the use of the position ($X_3$, $Y_3$). Thus, the self-contained navigation restarts from the position $M3a$ (namely, $G_3$).

As a result, the measurement error component of the self-contained navigation processor 4 having accumulated up to the current time is eliminated. At the spot of i=4, accordingly, the distance $d_4$ between the positions $G_4$ and $M_4$ becomes less than the predetermined value $\alpha$, and the position ($M_{x4}$, $M_{y4}$) obtained with the self-contained navigation processor 4 is delivered as the output current position ($X_4$, $Y_4$).

In this manner, the positional error of the navigation equipment can be converged to less than the predetermined distance $\alpha$ even when the drive path based on the self-contained navigation has deviated from the actual drive path (even when the traveling azimuth of the vehicle based on the azimuth measurement processor 2 has deviated).

By the way, the predetermined value $\alpha$ may be set at either a fixed value or a variable value which varies in correspondence with any parameter.

Now, the second embodiment of the navigation equipment according to the present invention will be described.

Figure 4:
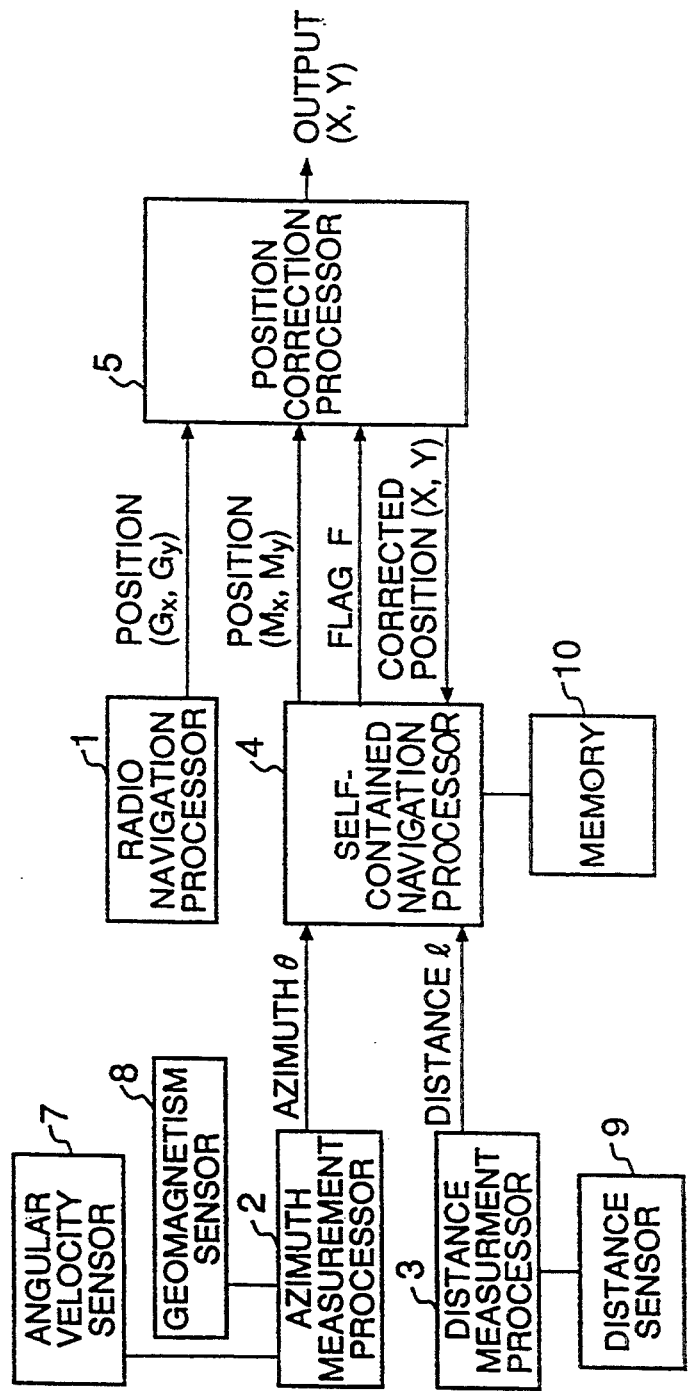
FIG. 4 is a block diagram showing the construction of a navigation equipment according to a second embodiment of the present invention.

FIG. 4 shows the construction of the navigation equipment in the second embodiment. As shown in the figure, the navigation equipment in the second embodiment is so constructed that, in the construction (refer to FIG. 1) of the navigation equipment in the first embodiment described before, a flag F is delivered from the self-contained navigation processor 4. The flag F indicates a value "1" when the position ($M_x$, $M_y$) measured by the self-contained navigation processor 4 lies on or in the vicinity of a road in the road map information, and it indicates a value "0" when it does not. The self-contained navigation processor 4 generates the flag F by comparing the measured position ($M_x$, $M_y$) with the road map information.

Next, the operation of the navigation equipment in the second embodiment will be explained.

Figure 5:
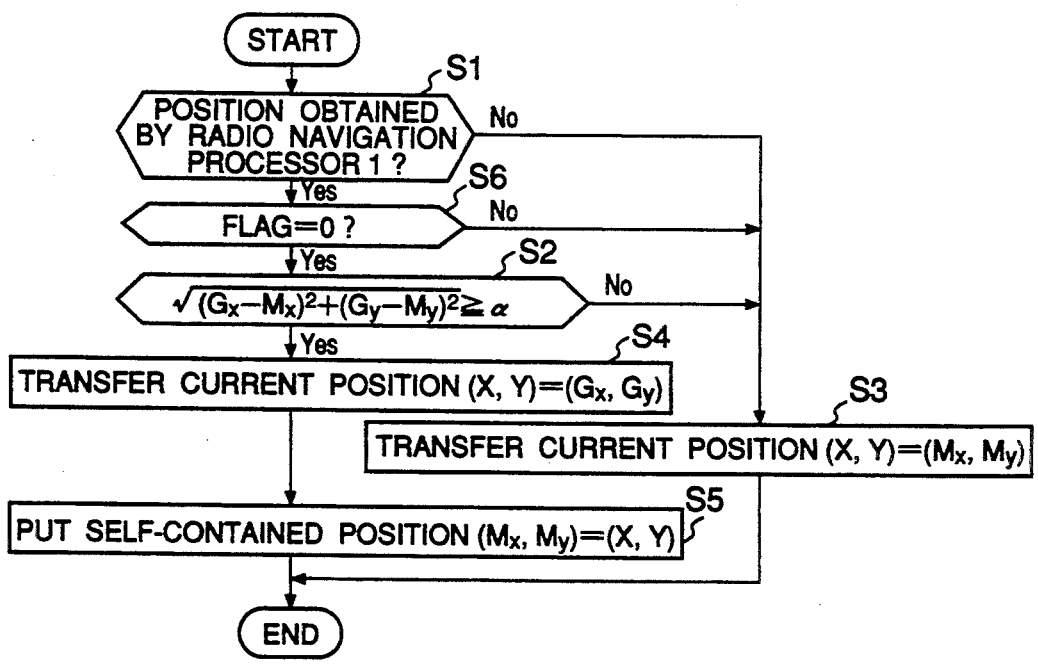
FIG. 5 is a flow chart showing the processing steps of the navigation equipment in the second embodiment.

FIG. 5 shows processing steps which are executed by the position correction processor 5 of the navigation equipment in the second embodiment.

As shown in the figure, the position correction processor 5 decides if the current position ($G_x$, $G_y$) has been obtained in the radio navigation processor 1, at a step S1. When the current position ($G_x$, $G_y$) has been obtained, the routine proceeds to a step S6, and when not, the routine proceeds to a step S3.

At the step S6, the position correction processor 5 decides if the flag F delivered from the self-contained navigation processor 4 has the value "0". When the flag F has the value "1" (that is, when the position measured by the self-contained navigation processor 4 lies on or in the vicinity of a road in the road map information), the reliability of the measured position ($M_x$, $M_y$) of the self-contained navigation processor 4 is high. Therefore, the routine proceeds to the step S3, at which the position correction processor 5 selects and delivers the evaluated position ($M_x$, $M_y$) of the self-contained navigation processor 4 as the output current position (X, Y). Then, it ends this series of processing steps. In contrast, when the flag F has the value "0", the routine proceeds to a step S2.

At the step S2, the position correction processor 5 computes the distance between the position ($G_x$, $G_y$) evaluated by the radio navigation processor 1 and the position ($M_x$, $M_y$) evaluated by the self-contained navigation processor 4, and it decides whether the distance between the coordinates of the two positions is, at least, a predetermined value $\alpha$ or is less than the predetermined value $\alpha$. When the distance has been decided as being the predetermined value $\alpha$ or greater, the routine proceeds to a step S4, and when not, the routine proceeds to the step S3.

At the step S4, the position correction processor 5 selects and delivers the evaluated position ($G_x$, $G_y$) of the radio navigation processor 1 as the output current position (X, Y). Subsequently, the routine proceeds to a step S5.

At the step S5, the coordinate values of the drive starting point of the self-contained navigation are corrected to a new drive starting point by the use of the position (X, Y) selected at the step S4. Then, the position correction processor 5 ends this series of processing steps.

In this manner, according to the second embodiment, the measured position ($M_x$, $M_y$) of the self-contained navigation processor 4 is relied on when it lies on or in the vicinity of a road in the road map information. Thus, even if the radio navigation processor 1 has measured and delivered an erroneous position, the navigation equipment can determine the precise position.

Now, the third embodiment of the navigation equipment according to the present invention will be described.

Figure 6:
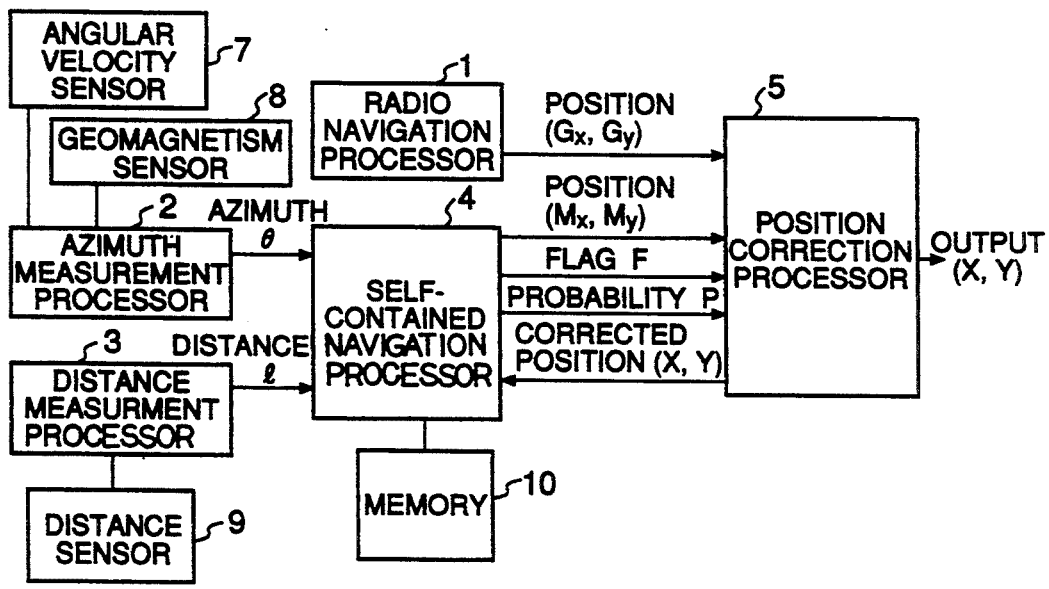
FIG. 6 is a block diagram showing the construction of a navigation equipment according to a third embodiment of the present invention.

FIG. 6 shows the construction of the navigation equipment in the third embodiment. As shown in the figure, the navigation equipment in the third embodiment is so constructed that, in the construction (refer to FIG. 4) of the navigation equipment in the second embodiment described before, a probability (namely, the degree of precision) P at which the position ($M_x$, $M_y$) evaluated by the self-contained navigation lies on or in the vicinity of a road in the road map information is delivered in terms of a numerical value from the self-contained navigation processor 4, in addition to the flag F mentioned before. By way of example, the probability P can be obtained as stated below. First, the positions measured by the self-contained navigation processor 4 and lying on or in the vicinity of a road are reckoned among the positions measured by this processor 4 during the drive time period lasting up to when the automobile reaches the current measured position ($M_x$, $M_y$) from a past spot traced back a prescribed distance. Subsequently, the ratio of the number of the reckoned positions to the total number of the positions measured during the drive time period is calculated. Further, in a case where the current measured position does not lie on or in the vicinity of the road, a value corresponding to a driven distance or a drive time period from the measurement spot which last lay on or in the vicinity of the road is subtracted from the calculated ratio, and the resulting numerical value is set as the probability P. Alternatively, the ratio itself may well be simply utilized as the probability P. Here, the ratio is approximately equivalent to that proportion of the distance at which the automobile is judged by the self-contained navigation processor 4 to have lain on or in the vicinity of the road during the drive time period taken for the automobile to reach the current measured position ($M_x$, $M_y$) from the past spot traced back the prescribed distance.

Accordingly, the ratio may well be a distance ratio evaluated as stated below by way of example. The positions measured by the self-contained navigation processor 4 during a drive time period lasting up to when the automobile reaches the current measured position ($M_x$, $M_y$) from a past spot traced back a prescribed distance, are connected successively in the order of measurements. Subsequently, in a line thus drawn, parts lying on or in the vicinity of the road have their total distance calculated. Finally, the ratio of the total distance to the prescribed distance is calculated and is set as the distance ratio for the probability P.

Figure 7:
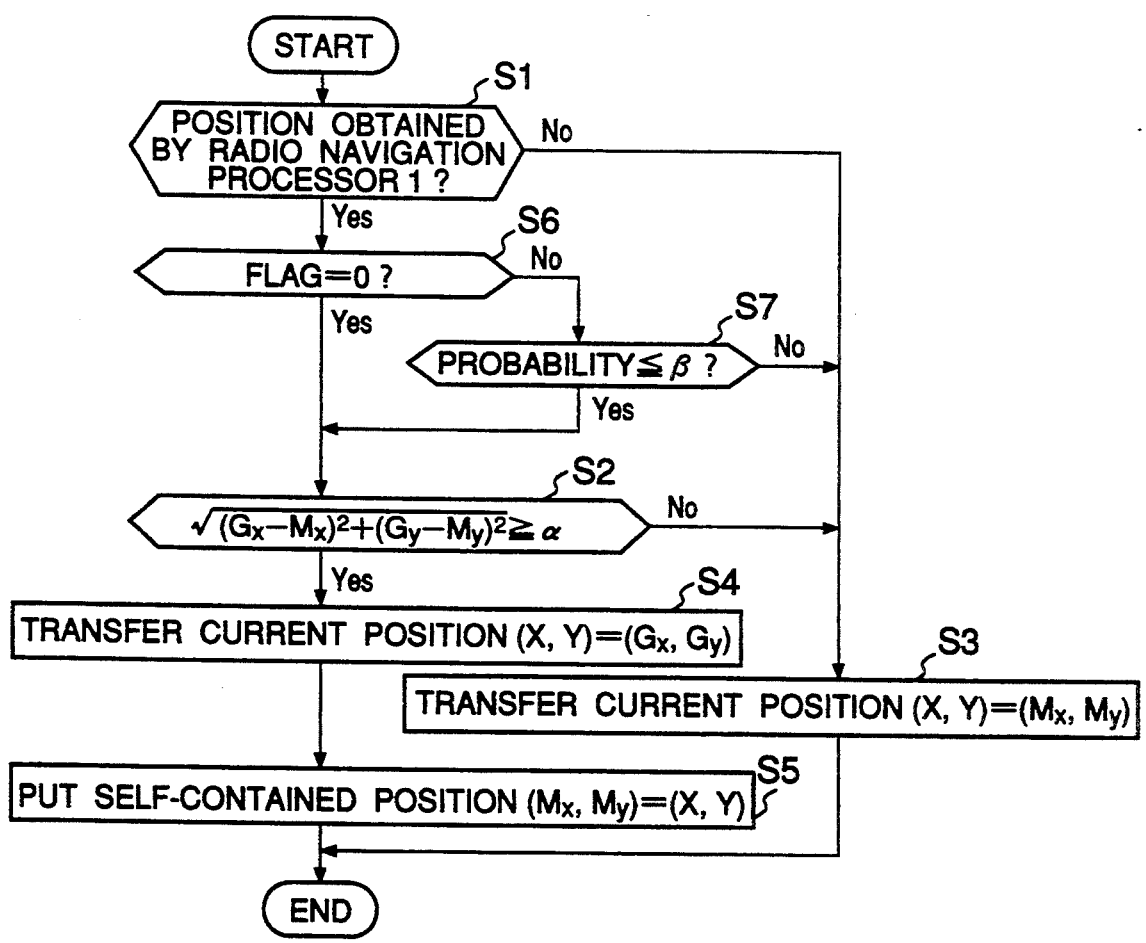
FIG. 7 is a flow chart showing the processing steps of the navigation equipment in the third embodiment.

FIG. 7 shows processing steps which are executed by the position correction processor 5.

As shown in the figure, in the third embodiment, the position correction processor 5 decides if the current position ($G_x$, $G_y$) has been obtained in the radio navigation processor 1, at a step S1. When the current position ($G_x$, $G_y$) has been obtained, the routine proceeds to a step S6, and when not, the routine proceeds to a step S3.

At the step S6, the position correction processor 5 decides if the flag F delivered from the self-contained navigation processor 4 has the value "0". When the flag F has the value "1" (that is, when the position ($M_x$, $M_y$) measured by the self-contained navigation lies on or in the vicinity of the road in the road map information), the routine proceeds to a step S7. In contrast, when the flag F has the value "0", the routine proceeds to a step S2.

At the step S7, the position correction processor 5 decides if the probability P delivered from the self-contained navigation processor 4 has, at most, a predetermined value $\beta$. When the probability P is greater than the predetermined value $\beta$ (that is, when the position ($M_x$, $M_y$) based on the self-contained navigation has been evaluated at the probability P greater than the value $\beta$), the routine proceeds to the step S3. On the other hand, when the probability P is not greater than the predetermined value $\beta$, the routine proceeds to the step S2 without relying on the decision that the measured position ($M_x$, $M_y$) lies on or in the vicinity of the road.

At the step S2, the position correction processor 5 computes the distance between the position ($G_x$, $G_y$) based on the radio navigation processor 1 and the position ($M_x$, $M_y$) based on the self-contained navigation processor 4, and it decides if the distance between the coordinates of the two positions has, at least, a predetermined value $\alpha$. When the distance has been decided as having the predetermined value $\alpha$ or greater, the routine proceeds to a step S4, and when not, the routine proceeds to the step S3.

At the step S3, the position correction processor 5 selects and delivers the position ($M_x$, $M_y$) of the self-contained navigation processor 4 as the output current position (X, Y). Then, it ends this series of processing steps.

At the step S4, the position correction processor 5 selects and delivers the position ($G_x$, $G_y$) of the radio navigation processor 1 as the output current position (X, Y). Subsequently, the routine proceeds to a step S5.

At the step S5, the coordinate values of the drive starting point of the self-contained navigation are reset to a new drive starting point by the use of the position (X, Y) selected at the step S4. Then, the position correction processor 5 ends this series of processing steps.

In this manner, according to the third embodiment, the output current position (X, Y) is determined considering even the degree of precision P of the measured position ($M_x$, $M_y$) of the self-contained navigation processor 4 in addition to the flag F in the navigation equipment of the second embodiment, so that the position can be determined more precisely.

Now, the fourth embodiment of the navigation equipment according to the present invention will be described.

Figure 8:
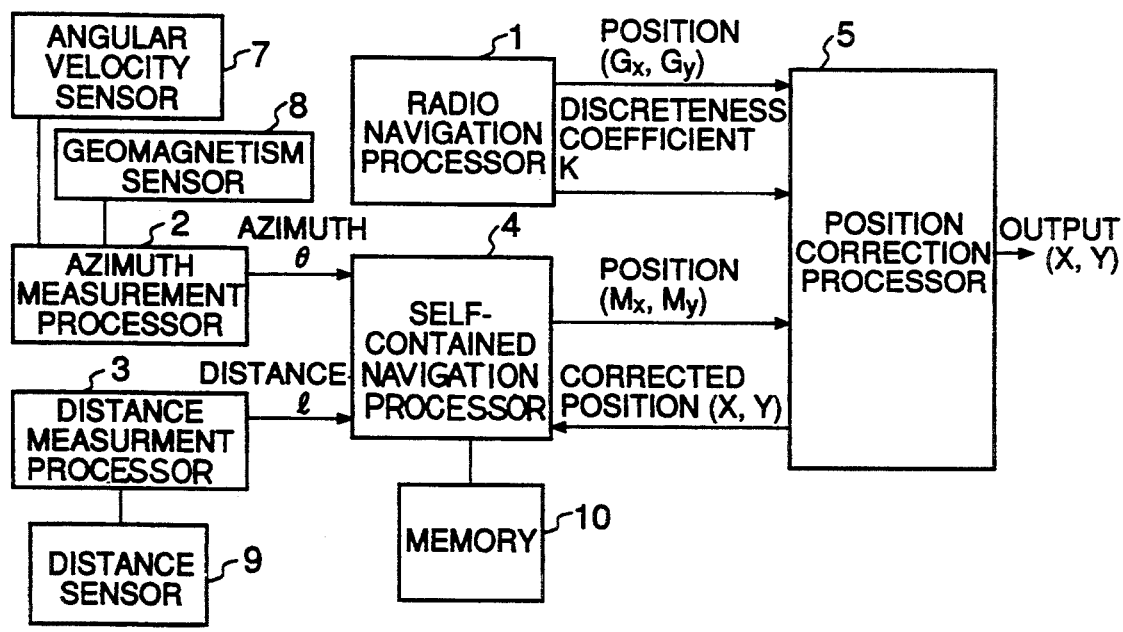
FIG. 8 is a block diagram showing the construction of a navigation equipment according to a fourth embodiment of the present invention.

The construction of the navigation equipment in the fourth embodiment is shown in FIG. 8.

As shown in the figure, the navigation equipment in the fourth embodiment is so constructed that, in the construction (refer to FIG. 1) of the navigation equipment in the first embodiment described before, a discreteness coefficient K is delivered from the radio navigation processor 1. The discreteness coefficient K may be, for example, the value of the DOP (Dulution Of Precision), such as HDOP (Horizontal Dulution Of Precision) or PDOP (Position Dulution Of Precision), at the current position. Alternatively, the discreteness coefficient K may well be the summation of deviations or differences which are involved between the path of the positions ($G_x$, $G_y$) measured by the radio navigation processor 1 and that of the positions ($M_x$, $M_y$) measured by the self-contained navigation processor 4 during a certain past time period, in other words, an area which is enclosed with the path of the measured positions ($G_x$, $G_y$) based on the radio navigation and that of the measured positions ($M_x$, $M_y$) based on the self-contained navigation. Incidentally, any of such discreteness coefficients must have a greater numerical value as the measured positions ($G_x$, $G_y$) of the radio navigation processor 1 become more discrete.

Figure 9:
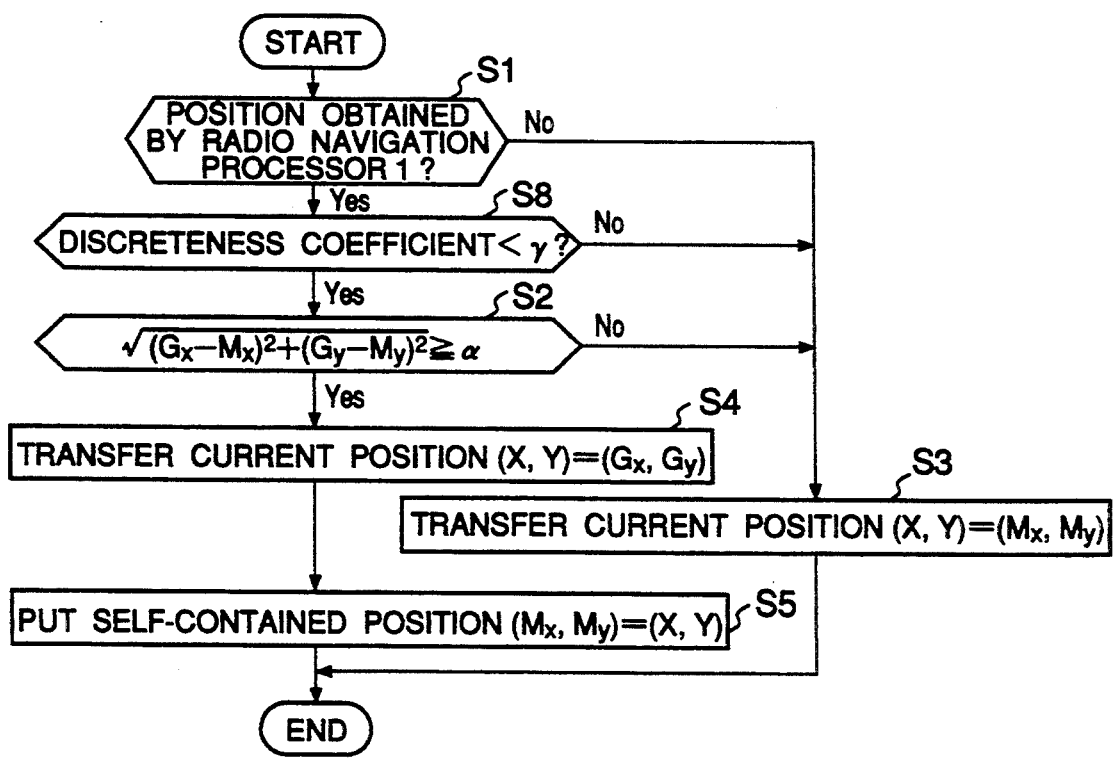
FIG. 9 is a flow chart showing the processing steps of the navigation equipment in the fourth embodiment.

FIG. 9 shows processing steps which are executed by the position correction processor 5.

As shown in the figure, the position correction processor 5 decides if the current position ($G_x$, $G_y$) has been obtained in the radio navigation processor 1, at a step S1. When the current position ($G_x$, $G_y$) has been obtained, the routine proceeds to a step S8, and when not, the routine proceeds to a step S3.

At the step S8, the position correction processor 5 decides if the discreteness coefficient K is less than a predetermined value $\gamma$. When the discreteness coefficient K is not less than the predetermined value $\gamma$, the reliability of the current position ($G_x$, $G_y$) is low, and hence, the routine proceeds to the step S3 without adopting the position ($G_x$, $G_y$) as the output current position (X, Y). In contrast, when the discreteness coefficient K is less than the predetermined value $\gamma$, the routine proceeds to a step S2.

At the step S2, the position correction processor 5 computes the distance between the position ($G_x$, $G_y$) based on the radio navigation processor 1 and the position ($M_x$, $M_y$) based on the self-contained navigation processor 4, and it decides if the distance between the coordinates of the two positions is, at least, a predetermined value $\alpha$. When the distance has been decided as being the predetermined value $\alpha$ or greater, the routine proceeds to a step S4, and when not, the routine proceeds to the step S3.

At the step S3, the position correction processor 5 selects and delivers the position ($M_x$, $M_y$) of the self-contained navigation processor 4 as the output current position (X, Y). Then, it ends this series of processing steps.

At the step S4, the position correction processor 5 selects and delivers the evaluated position ($G_x$, $G_y$) of the radio navigation processor 1 as the output current position (X, Y). Subsequently, the routine proceeds to a step S5.

At the step S5, the coordinate values of the drive starting point of the self-contained navigation are reset to a new drive starting point by the use of the position (X, Y) selected at the step S4. Then, the position correction processor 5 ends this series of processing steps.

In this manner, according to the fourth embodiment, the output current position (X, Y) is determined considering also the reliability of the measured position ($G_x$, $G_y$) of the radio navigation processor 1, so that the position can be determined more precisely.

By the way, the decision processing (the step S8) executed in this embodiment on the basis of the discreteness coefficient K delivered from the radio navigation processor 1 is also applicable to the first thru third embodiments.

Now, the fifth embodiment of the navigation equipment according to the present invention will be described.

Figure 10:
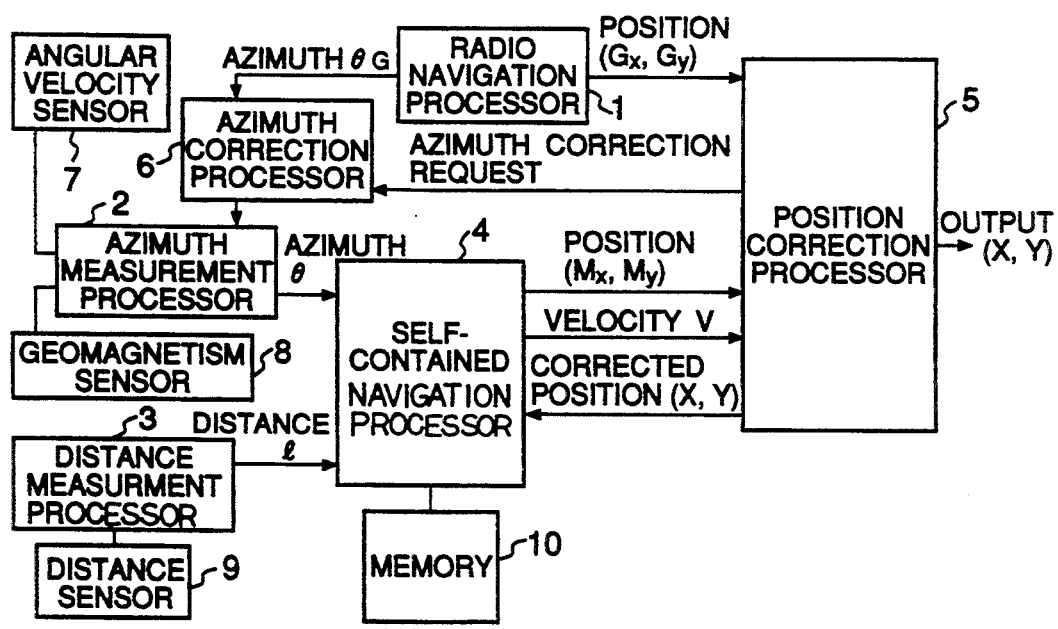
FIG. 10 is a block diagram showing the construction of a navigation equipment according to a fifth embodiment of the present invention.

FIG. 10 shows the construction of the navigation equipment in the fifth embodiment.

Referring to the figure, a radio navigation processor 1 determines a current position ($G_x$, $G_y$) and a moving azimuth $\theta_G$ through the technique of triangular surveying based on the signals of artificial satellites (not shown).

An azimuth measurement processor 2 calculates and delivers the traveling azimuth $\theta$ of the vehicle by the use of angular velocity data detected by an angular velocity sensor 7 or/and geomagnetic data detected by a geomagnetism sensor 8.

A distance measurement processor 3 measures and delivers the driven distance l of the vehicle on the basis of pulses received from a distance sensor 9.

A self-contained navigation processor 4 determines a measured position ($M_x$, $M_y$) in such a way that the distance data of the distance measurement processor 3 and the azimuth data of the azimuth measurement processor 2 with respect to a certain drive starting point which is set manually or automatically are integrated to calculate an estimated position, and that the estimated position, or the drive history of the vehicle based on the estimated positions is collated with road map information read out of a memory 10. The processor 4 also calculates and delivers the velocity V of the vehicle.

A position correction processor 5 is supplied with the position ($G_x$, $G_y$) produced by the radio navigation processor 1 and the position ($M_x$, $M_y$) as well as the velocity V produced by the self-contained navigation processor 4, and it selects and delivers the position ($G_x$, $G_y$) or the position ($M_x$, $M_y$) as an output current position (X, Y) on the basis of a predetermined deciding method. In addition, when the processor 5 has selected the position ($G_x$, $G_y$) of the radio navigation processor 1 as the output current position (X, Y), it corrects the drive starting point of the self-contained navigation processor 4, with the output current position (X, Y). Simultaneously, the processor 5 issues an azimuth correction request to an azimuth correction processor 6.

In compliance with the azimuth correction request received from the position correction processor 5, the azimuth correction processor 6 corrects the calculated traveling azimuth $\theta$ of the azimuth measurement processor 2 with the moving azimuth $\theta_G$ determined by the radio navigation processor 1.

Figure 11:
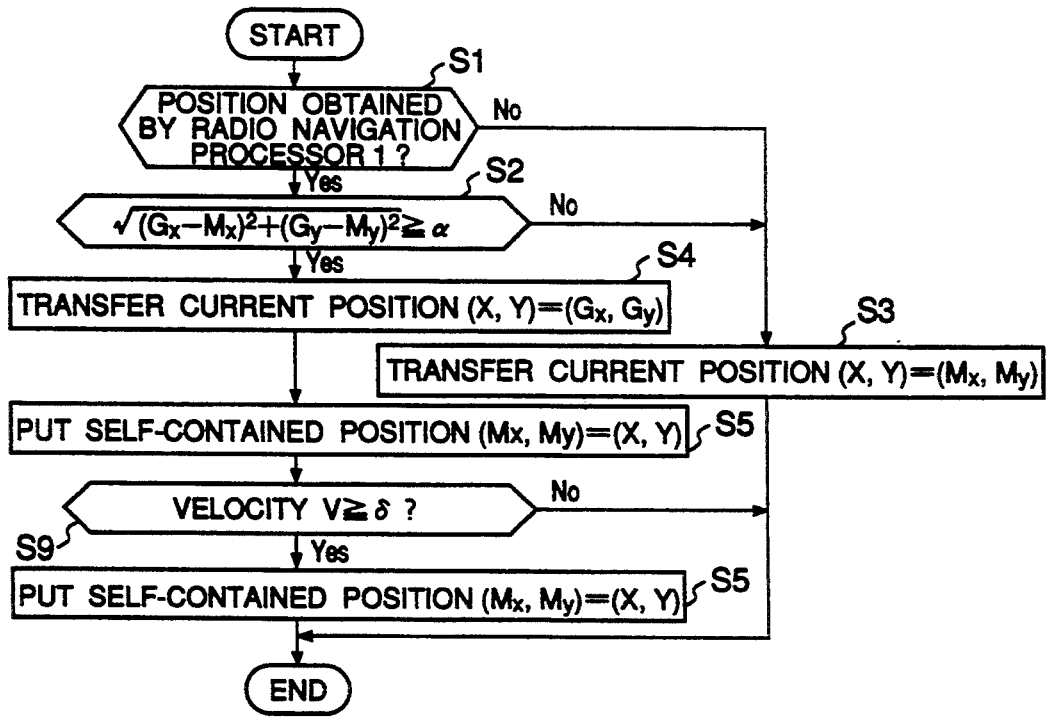
FIG. 11 is a flow chart showing the processing steps of the navigation equipment in the fifth embodiment.

Next, FIG. 11 shows processing steps which are executed by the position correction processor 5 of the navigation equipment in the fifth embodiment.

As shown in the figure, the position correction processor 5 decides if the current position ($G_x$, $G_y$) has been obtained in the radio navigation processor 1, at a step S1. When the current position ($G_x$, $G_y$) has been obtained, the routine proceeds to a step S2, and when not, the routine proceeds to a step S3.

At the step S2, the position correction processor 5 computes the distance between the position ($G_x$, $G_y$) based on the radio navigation processor 1 and the position ($M_x$, $M_y$) based on the self-contained navigation processor 4, and it decides whether the distance between the coordinates of the two positions is, at least, a predetermined value $\alpha$ or is less than the predetermined value $\alpha$. When the distance has been decided as being the predetermined value $\alpha$ or greater, the routine proceeds to a step S4, and when not, the routine proceeds to the step S3.

At the step S3, the position correction processor 5 selects and delivers the position ($M_x$, $M_y$) of the self-contained navigation processor 4 as the output current position (X, Y). Then, it ends this series of processing steps.

At the step S4, the position correction processor 5 selects and delivers the position ($G_x$, $G_y$) of the radio navigation processor 1 as the output current position (X, Y). Subsequently, the routine proceeds to a step S5.

Here at the step S5, the coordinate values of the drive starting point managed by the self-contained navigation processor 4 are corrected to a new drive starting point by the use of the position (X, Y) selected at the step S4. Thereafter, the routine proceeds to a step S9.

At the step S9, the position correction processor 5 decides if the vehicle velocity V delivered from the self-contained navigation processor 4 has, at least, a predetermined value $\delta$. When the velocity V is the predetermined value $\delta$ or greater, the deviation of the traveling azimuth $\theta$ is greatly influential, and hence, the routine proceeds to a step S10 in order to correct the traveling azimuth $\theta$. In contrast, when the velocity V is less than the predetermined value $\delta$, the position correction processor 5 ends this series of processing steps.

At the step S10, the processor 5 corrects the measured traveling azimuth $\theta$ of the azimuth measurement processor 2 by the use of the evaluated moving azimuth $\theta_G$ of the radio navigation processor 1, and it ends this series of processing steps.

By the way, the first thru fourth embodiments can also utilize that processing (the steps S9 and S10) employed in the fifth embodiment in which, when the vehicle velocity V is not less than the predetermined value $\delta$, the traveling azimuth $\theta$ of the azimuth measurement processor 2 is corrected with the moving azimuth $\theta_G$ of the radio navigation processor 1 so as to set $\theta = \theta_G$ thenceforth.

Owing to such processing steps as are illustrated in FIG. 11, the operation of the navigation equipment in the fifth embodiment is carried out as stated below.

Figure 12:
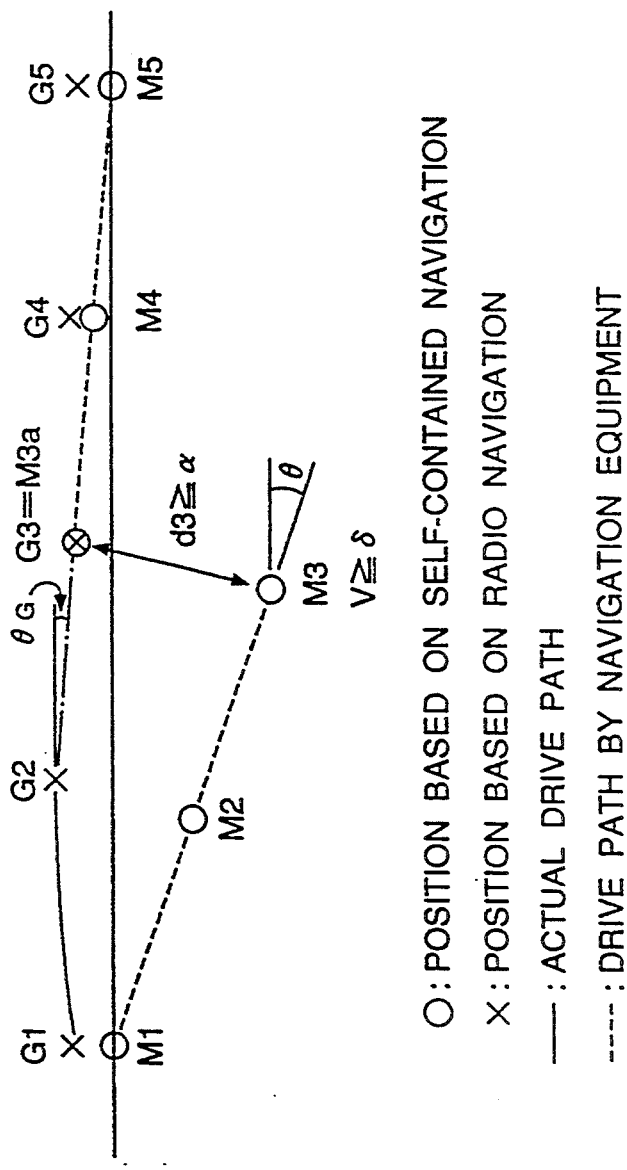
FIG. 12 is an explanatory diagram showing the operating example of the navigation equipment in the fifth embodiment.

FIG. 12 shows the operating example of the navigation equipment of the first embodiment.

Referring to the figure, symbol $G_i$ denotes the position ($G_x$, $G_y$) evaluated by the radio navigation processor 1, while symbol $M_i$ denotes the position ($M_x$, $M_y$) evaluated by the self-contained navigation processor 4. Besides, letter i (i=1, 2, ..., n) denotes the position corresponding to a time. A solid line indicates the actual drive path of the automobile, while a broken line indicates the drive path of the automobile measured and presented by the navigation equipment. For brevity of explanation, it is assumed that the vehicle is advancing in an identical direction to straight line.

At the spot of i=1, the distance $d_1$ between the positions $G_1$ and $M_1$ is less than the predetermined value $\alpha$, so that the position ($M_{x1}$, $M_{y1}$) obtained with the self-contained navigation processor 4 is delivered as the output current position ($X_1$, $Y_1$).

At the spot of i=2, as in the processing at the spot of i=1, the distance $d_2$ between the positions $G_2$ and $M_2$ is less than the predetermined value $\alpha$, so that the position ($M_{x2}$, $M_{y2}$) obtained with the self-contained navigation processor 4 is delivered as the output current position ($X_2$, $Y_2$).

Meanwhile, the distance $d_3$ between the positions $G_3$ and $M_3$ is the predetermined value $\alpha$ or greater at the spot of i=3. At this spot, therefore, the input position ($G_{x3}$, $G_{y3}$) obtained with the radio navigation processor 1 is delivered as the output current position ($X_3$, $Y_3$). Simultaneously, the drive starting position ($M_{x3}$, $M_{y3}$) managed by the self-contained navigation is corrected to the new drive starting point by the use of the position ($X_3$, $Y_3$). Thus, the self-contained navigation restarts from the position $M3a$ (namely, $G_3$). Further, the measured traveling azimuth $\theta$ of the azimuth measurement processor 2 is corrected with the evaluated moving azimuth $\theta_G$ of the radio navigation processor 1 so as to set the succeeding traveling azimuth as $\theta = \theta_G$.

At the spot of i=4, the distance $d_4$ between the positions $G_4$ and $M_4$ is less than the predetermined value $\alpha$, and hence, the position ($M_{x4}$, $M_{y4}$) obtained with the self-contained navigation processor 4 is delivered as the output current position ($X_4$, $Y_4$).

In this manner, according to the fifth embodiment, the position error of the navigation equipment becomes less than the predetermined distance $\alpha$ even when the drive path based on the self-contained navigation has deviated from the actual drive path (even when the traveling azimuth $\theta$ of the vehicle based on the azimuth measurement processor 2 has deviated). Moreover, when the velocity V of the vehicle is the certain predetermined value $\delta$ or greater, the traveling azimuth $\theta$ is also corrected, so that the accuracy of the succeeding self-contained navigation can be enhanced.

As described above, according to the embodiments of the present invention, the deviation or difference between the positions of radio navigation and self-contained navigation is checked, and the position of the self-contained navigation is corrected with the evaluated current position of the radio navigation when the deviation has enlarged, whereby a stable state wherein the positional error of the navigation equipment is always less than a predetermined distance can be maintained. Moreover, the accuracy of the self-contained navigation and that of the radio navigation are ascertained so as not to utilize the radio navigation more than is necessary, whereby a more precise position can be offered. Furthermore, when the position of the self-contained navigation is corrected with the position evaluated by the radio navigation, the azimuth of a vehicle is corrected conjointly, whereby the positions of the succeeding self-contained navigation can be made more precise.

Consequently, the present invention can provide the navigation equipment which can measure the positions more precisely under various circumstances.

What is claimed is:

1. A navigation equipment which is installed on a mobile object in order to produce a current position of the mobile object as an output, comprising:
  radio navigation means for measuring the current position of said mobile object on the basis of electric waves received from artificial satellites;

azimuth measurement means for measuring a traveling azimuth of said mobile object on the basis of at least one of an angular velocity and a geomagnetic angle;

distance measurement means for measuring a driven distance of said mobile object;

memory means for storing road map information therein;

self-contained navigation means for estimating one of said current position of said mobile object and a drive history thereof up to a current time by use of the traveling azimuth measured by said azimuth measurement means and the driven distance measured by said distance measurement means up to the current time since a given drive starting position, and then collating one of the estimated current position or the estimated drive history with the road map information read out of said memory means, thereby determining a current position of said mobile object; and position correction means for delivering the determined current position of said self-contained navigation means as the final current position in a case where said determined current position of said self-contained navigation means and the measured current position of said radio navigation means do not differ in excess of a predetermined distance, and for delivering said measured current position of said radio navigation means as the final current position and also giving said self-contained navigation means said measured current position of said radio navigation means as a new drive starting point in a case where the determined and measured current positions differ in excess of the predetermined distance, said position correction means collates said determined current position of said self-contained navigation means with said road map information, thereby deciding if said determined current position lies either on or in the vicinity of a road; and upon deciding that said determined current position lies either on or in the vicinity of the road, said position correction means delivers said determined current position of said self-contained navigation means as said final current position and does not give said self-contained navigation means said measured current position of said radio navigation means as the new drive starting point even in the case where said determined and measured current positions differ in excess of said predetermined distance.

2. A navigation equipment as defined in claim 1, wherein said position correction means obtains a history of the current positions which have been measured by said radio, navigation means; and on condition that the current positions indicated by the obtained history is discrete, said position correction means delivers said determined current position of said self-contained navigation means as said final current position and does not give said self-contained navigation means said measured current position of said radio navigation means as said new drive starting point even in said case where said determined and measured current positions differ in excess of said predetermined distance.

3. A navigation equipment as defined in claim 1, further comprising:

drive velocity measurement means for measuring a drive velocity of said mobile object;

said radio navigation means also measuring a moving direction of said mobile object on the basis of the electric waves received from said artificial satellites; and azimuth correction means for deciding if the measured drive velocity of said drive velocity measurement means has, at least, a predetermined value, in the case where said position correction means delivers the measured final current position of said radio navigation means and also gives said self-contained navigation means said measured current position of said radio navigation means as said new drive starting point; and for correcting said azimuth measurement means by delivering the measured moving direction of said radio navigation means as a current traveling azimuth, on condition that said measured drive velocity has, at least, the predetermined value.

4. A navigation equipment as defined in claim 2, further comprising:

drive velocity measurement means for measuring a drive velocity of said mobile object;

said radio navigation means also measuring a moving direction of said mobile object on the basis of the electric waves received from said artificial satellites; and azimuth correction means for deciding if the measured drive velocity of said drive velocity measurement means has, at least, a predetermined value, in the case where said position correction means delivers the measured final current position of said radio navigation means and also gives said self-contained navigation means said measured current position of said radio navigation means as said new drive starting point; and for correcting said azimuth measurement means by delivering the measured moving direction of said radio navigation means as a current traveling azimuth, on condition that said measured drive velocity has, at least, the predetermined value.

5. A navigation equipment which is installed on a mobile object in order to produce a current position of the mobile object as an output, comprising:

radio navigation means for measuring the current position of said mobile object on the basis of electric waves received from artificial satellites;

azimuth measurement means for measuring a traveling azimuth of said mobile object on the basis of at least one of an angular velocity and a geomagnetic angle;

distance measurement means for measuring a driven distance of said mobile object;

memory means for storing road map information therein;

self-contained navigation means for estimating one of said current position of said mobile object and a drive history thereof up to a current time by use of the traveling azimuth measured by said azimuth measurement means and the driven distance measured by said distance measurement means up to the current time since a given drive starting position, and then collating one of the estimated current position or the estimated drive history with the road map information read out of said memory means, thereby determining a current position of said mobile object; and position correction means for delivering the determined current position of said self-contained navigation means as the final current position in a case where said determined current position of said self-contained navigation means and the measured current position of said radio navigation means do not differ in excess of a predetermined distance, and for delivering said measured current position of said radio navigation means as the final current position and also giving said self-contained navigation means said measured current position of said radio navigation means as a new drive starting point in a case where the determined and measured current positions differ in excess of the predetermined distance, said position correction means collates said determined current position of said self-contained navigation means with said road map information, thereby deciding if said determined current position lies either on or in the vicinity of a road; upon deciding that said determined current position lies either on or in the vicinity of the road, said position correction means further decides a probability at which said determined current position lies either on or in the vicinity of said road according to the current positions measured by said self-contained navigation means during a period of predetermined time length up to said current time; and upon deciding that the probability has, at least, a predetermined magnitude, said position correction means delivers said determined current position of said self-contained navigation means as said final current position and does not give said self-contained navigation means said measured current position of said radio navigation means as the new drive starting point even in the case where said determined and measured current positions differ in excess of said predetermined distance.

6. A navigation equipment as defined in claim 5, wherein said self-contained navigation means calculates a ratio of a distance over which said mobile object is estimated to be either on or in the vicinity of said road and a predetermined distance, from a history which contains said determined current position of said self-contained navigation means and the current positions determined by said self-contained navigation means during a time period up to said current time since a point of time traced back from said current time a length of time corresponding to the predetermined distance; and it delivers the calculated ratio as said probability.

7. A navigation equipment as defined in claim 5, wherein said self-contained navigation means calculates a ratio of a distance over which said mobile object is estimated to be either on or in the vicinity of said road and a predetermined distance, from a history which contains said determined current position of said self-contained navigation means and the current positions determined during a time period up to said current time since a point of time traced back from said current time a length of time corresponding to the predetermined distance; on condition that said determined current position of said self-contained navigation means does not lie either on or in the vicinity of said road, said self-contained navigation means subtracts from the ratio a value corresponding to either of a driven distance or a drive time period from a spot at which said mobile object is decided as having last lain either on or in the vicinity of said road; and said self-contained navigation means delivers a result of the subtraction as said probability.

8. A navigation equipment as defined in claim 5, wherein said position correction means obtains a history of the current positions which have been measured by said radio navigation means; and on condition that the current positions indicated by the obtained history is discrete, said position correction means delivers said determined current position of said self-contained navigation means as said final current position and does not give said self-contained navigation means said measured current position of said radio navigation means as said new drive starting point even in said case where said determined and measured current positions differ in excess of said predetermined distance.

9. A navigation equipment as defined in claim 5, further comprising:
drive velocity measurement means for measuring a drive velocity of said mobile object;
said radio navigation means also measuring a moving direction of said mobile object on the basis of the electric waves received from said artificial satellites; and
azimuth correction means for deciding if the measured drive velocity of said drive velocity measurement means has, at least, a predetermined value, in the case where said position correction means delivers the measured final current position of said radio navigation means and also gives said self-contained navigation means said measured current position of said radio navigation means as said new drive starting point; and for correcting said azimuth measurement means by delivering the measured moving direction of said radio navigation means as a current traveling azimuth, on condition that said measured drive velocity has, at least, the predetermined value.

10. A navigation equipment as defined in claim 8, further comprising:
drive velocity measurement means for measuring a drive velocity of said mobile object;
said radio navigation means also measuring a moving direction of said mobile object on the basis of the electric waves received from said artificial satellites; and
azimuth correction means for deciding if the measured drive velocity of said drive velocity measurement means has, at least, a predetermined value, in the case where said position correction means delivers the measured final current position of said radio navigation means and also gives said self-contained navigation means said measured current position of said radio navigation means as said new drive starting point; and for correcting said azimuth measurement means by delivering the measured moving direction of said radio navigation means as a current traveling azimuth, on condition that said measured drive velocity has, at least, the predetermined value.

* * * * *